April 10, 1928.
S. W. ALDERFER
1,666,038
METHOD AND APPARATUS FOR THE MANUFACTURE OF TIRE BEADS
Filed May 28, 1926
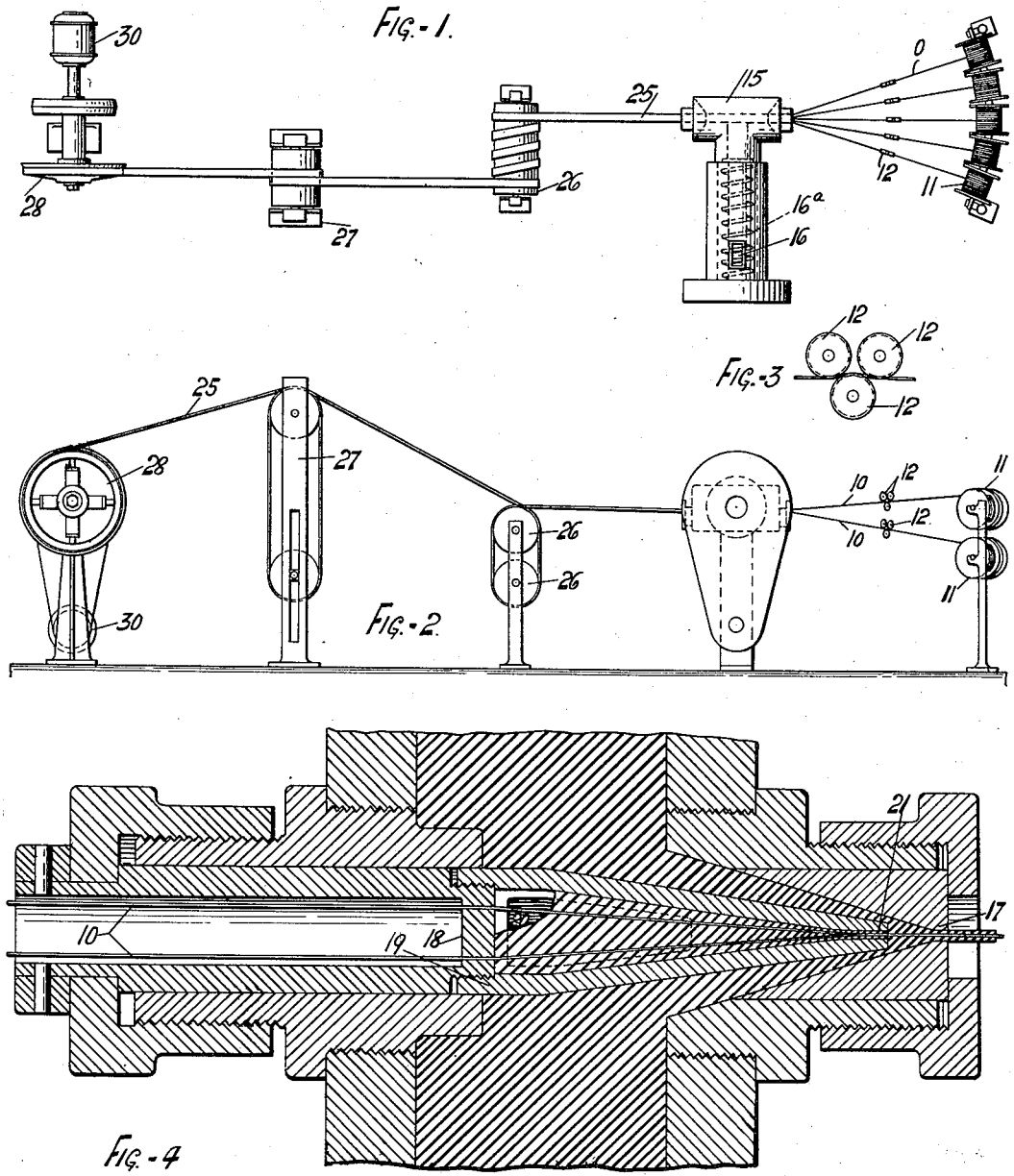
INVENTOR.
STERLING W. ALDERFER.
BY
ATTORNEY.

Patented Apr. 10, 1928.

1,666,038

UNITED STATES PATENT OFFICE.

STERLING W. ALDERFER, OF AKRON, OHIO.

METHOD AND APPARATUS FOR THE MANUFACTURE OF TIRE BEADS.

Application filed May 28, 1926. Serial No. 112,358.

This invention relates to the art of manufacturing pneumatic tires and particularly to the straight side or inextensible bead type, in which the beads of the tire are reinforced and rendered non-stretchable by the incorporation of wires in the beads.

These tire beads comprise a plurality of layers of wire tape which are impregnated with rubber and wrapped about a circular form so as to constitute the reinforcement. A filler of rubber composition is usually added, the structure wrapped with fabric and then given a preliminary vulcanization to shape it to substantially its final form.

The present invention has to do with the construction of the wire reinforcement. Heretofore, two well known types of wire tape have been employed, one of braided tape in which a plurality of wires are braided together to form a flat ribbon, and the other a woven tape in which a plurality of parallel wires are held in position by a light wire interwoven between the parallel wires and holding them in flat position.

Either of the methods of the prior art has certain disadvantages, both requiring special machinery for the manufacture of the tape. Furthermore, the wire will oftentimes be forced into an angular position in the building of the bead, and as both of the earlier forms of tape are somewhat inflexible, these forms of tape are not entirely satisfactory and are improved upon by the method of manufacture herein illustrated.

The present invention has for its object the manufacture of a wire tape suitable for building tire beads without a weaving or braiding operation, the wires being led directly from a plurality of separate supply reels and introduced into spaced relation into a rubber extruding machine having a die through which the wire strands pass out covered and surrounded by a mass of tenacious rubber composition which serves to hold the wires together. Before the wires are conducted into the die they are preferably given a preliminary bending or setting so that they will acquire a permanent set in substantially the circle in which they are to be incorporated, although it is preferable to give them a somewhat smaller arc, the purpose of which is to cause the wires to remain in the proper position in the bead and to eliminate any tendency to separate or spring outwardly.

From the die the wire, coated and impregnated with rubber composition, passes over cooling rolls or through cold water which will harden the rubber composition and also contribute to its maintaining the permanent curvature. It then passes over a compensator or storage rolls and on to the rotating bead ring or form.

The essential feature of the present invention is the formation of a bead reinforcing tape from a plurality of unconnected wires, led from separate sources and held in fixed relationship solely by the mass of rubber which is forced about and around the wires, the wires being given a set or bend by which they will assume a fixed position in the bead structure and will not tend to fly out or separate from one another. The immediate cooling of the rubber composition will assist in maintaining the compactness of the bead ring.

By forming the bead reinforcement in the manner described, all preliminary weaving or braiding operations are dispensed with, and it will be possible for the manufacturer to construct beads directly from wire in the spool. Furthermore, the fact that the wires pass from the covering or insulating machine without any connection between them other than afforded by the mass of rubber enables the tape to be laid at an angle upon the bead ring without distorting the tape.

Other advantages and benefits will be obtained by the method and apparatus for the manufacture of beads as explained and set forth herein, which will be understood and appreciated by those skilled in this art, and while the description and drawings are specific in showing one form of the invention, it will be appreciated that other forms and embodiments may be made within the scope of the invention as set forth in the claims herein.

In the drawings:

Figure 1 is a plan view of a complete unit for the manufacture of the bead reinforcement by the improved method;

Figure 2 is a side elevation;

Figure 3 is an enlarged detail of the bending or setting rolls;

Figure 4 is an enlarged section through the extruding or insulating die, a portion of the rubber within the die being omitted to show more clearly the operation of the apparatus; and Figure 5 is a cross-section of the tape.

The wires for the formation of the bead reinforcement are indicated at 10. They are of any suitable number and are led from a plurality of reels or separated supplies 11. These wires may be given a preliminary curvature or set before they are assembled upon the rolls, but if not, or if the set is not of the right curvature or permanency, the wires are led between setting rolls 12 which are so set and adjusted as to cause the wire to conform to a circle similar to that which it will assume in the completed bead. It is preferable that this circle be of somewhat smaller diameter than the finished circle of the bead.

From the supplies the several wires are conducted into the extruding or insulating machine. This is indicated generally by the numeral 15. The rubber composition which is to be extended around and over the wires is of sufficient tenacity to hold the wires together in tape form. It is fed into the machine through the opening 16 from which it is forced by screw 16ª to the die head or opening 17. The wires 10 enter the machine from the rear in alignment with the die opening, being spaced apart by a guide 18. The wires are not in contact or in close proximity when they receive their initial coating of rubber, but are surrounded and encased by the rubber before being contracted to tape form.

This is accomplished by the spiral-shaped horn or guide 19 which is secured upon the guide 18. The sides of this horn are cut away, as shown at 20, to permit the mass of rubber to enter into the horn and surround and encase the wires before they are brought together. The wires converge toward the mouth 21 of the horn which is in alignment with and directly behind the die opening 17. At this point the tape receives an additional coating of rubber as it passes out of the die in the form shown in Figure 5.

By the arrangement illustrated in Figure 4, the rubber mass completely surrounds and encloses the wires as shown and the tape is given its permanency and form. The rubber is by this means thoroughly and completely forced in and around the wires and is thereby better able to hold the wires together.

The tape, as formed in the die, is indicated at 25. In insulating or extruding machines of the type shown, the rubber is heated so that it will flow more freely and readily. It is therefore advisable to cool the rubber so as to give it a greater tenacity. In the present machine this is accomplished by passing the tape over a pair of cooling drums 26. These drums not only chill the rubber but aid in giving the final set to the wires.

The tape then passes over compensator or take-up devices shown at 27, one of the devices being capable of rising and falling to comply with the demands of the operator. From this device the tape goes to the bead ring or form 28 of the usual type, which is driven by a motor 30 under control of the operator and upon which the required number of wires or plies are laid up to constitute the bead reinforcement. The bead is then completed by any of the well known methods familiar to the art.

The number of wires and their relationship may be varied within the discretion of the tire builder. The relation of the various steps may be attained and other changes may be made within the scope of the invention as will be appreciated by those skilled in the art.

What is claimed is:

1. A method of manufacturing beads for pneumatic tires, comprising the steps of leading a plurality of separate wires from individual sources without weaving or braiding, imparting to the wires a curvature similar to that which they will assume in the completed bead, extruding a mass of tenacious rubber composition about the wires, reducing the wires and the rubber to tape form, and winding the tape thus formed into a ring to constitute a reinforcement for the bead.

2. A method of manufacturing beads for pneumatic tires, comprising the steps of leading a plurality of separate wires from individual sources, imparting to each wire a curvature similar to that which it will assume in the completed bead, extruding a mass of tenacious rubber composition about the wires, forming the wires and rubber into a tape, and winding the tape thus formed into a ring to constitute a reinforcement for the bead.

3. A method of manufacturing beads for pneumatic tires, comprising the steps of leading a plurality of separate wires from individual sources, imparting to each wire a curvature similar to that which it will assume in the completed bead, extruding a mass of heated tenacious rubber composition about the wires, forming the wires and rubber into a tape, cooling the tape, and winding the tape thus formed into a ring to constitute a reinforcement for the bead.

4. A method of manufacturing beads for pneumatic tires, comprising the steps of leading a plurality of separate wires from individual sources, giving the wires a permanent curved set corresponding to the curvature of the completed bead, surrounding and encasing the wires in a mass of rubber, and forming the bead therefrom.

5. A method of manufacturing beads for pneumatic tires, comprising the steps of giving the wires a permanent curved set corresponding to the curvature of the completed bead, bringing the wires into parallel relationship and surrounding and encasing them into a mass of rubber, forming the wires and rubber into a tape, and winding the tape about a form to constitute the bead reinforcement.

6. A method of manufacturing beads for pneumatic tires, comprising the steps of giving the wires a permanent curved set corresponding to the curvature of the completed bead, bringing the wires into parallel relationship without connecting said wires together and surrounding and encasing them in a mass of rubber, forming the wires and the rubber into a strip, and winding the strip about a form to constitute the bead reinforcement.

7. Apparatus for the manufacture of tire beads, comprising a plurality of sources of supply for separate wires, a device for imparting a permanent curvature in the wires corresponding to the curvature of the completed bead, an extruding machine for surrounding and encasing the wires in a mass of warm rubber to form a strip, cooling rolls about which the rubber and wires pass, and a rotating form about which the strip is wrapped to form a bead.

8. Apparatus for the manufacture of tire beads, comprising a plurality of sources of supply for separate wires, a device for imparting a permanent curvature in the wires corresponding to the curvature of the completed bead, an extruding machine for surrounding and encasing the wires in a mass of rubber to form a strip, and a rotating form about which the strip is wrapped to form a bead.

9. Apparatus for the manufacture of tire beads, comprising a plurality of sources of supply for separate wires, a device for imparting a permanent curvature in the wires corresponding to the curvature of the completed bead, an extruding machine for surrounding and encasing the wires in a mass of warm rubber to form a strip, cooling rolls about which the rubber and wires pass, a take-up device for the strip, and a rotating form about which the strip is wrapped to form a bead.

STERLING W. ALDERFER.